United States Patent
Gaudig et al.

(10) Patent No.: US 9,834,148 B2
(45) Date of Patent: Dec. 5, 2017

(54) STORAGE COMPARTMENT WITH MAGNETIC DIVIDING ELEMENTS

(71) Applicant: GM GLOBAL TECHNOLOGY OPERATIONS LLC, Detroit, MI (US)

(72) Inventors: Ralf Gaudig, Ruesselsheim (DE); Juergen Maier, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/060,963

(22) Filed: Mar. 4, 2016

(65) Prior Publication Data
US 2016/0257255 A1 Sep. 8, 2016

(30) Foreign Application Priority Data
Mar. 5, 2015 (DE) .......................... 10 2015 002 834

(51) Int. Cl.
*B60R 7/04* (2006.01)
*B60N 3/10* (2006.01)

(52) U.S. Cl.
CPC ................. *B60R 7/04* (2013.01); *B60N 3/10* (2013.01); *B60N 3/103* (2013.01); *B60N 3/107* (2013.01)

(58) Field of Classification Search
CPC .. B60R 7/04; B60N 3/10; B60N 3/103; B60N 3/107
USPC ....................................................... 296/37.8
See application file for complete search history.

(56) References Cited

U.S. PATENT DOCUMENTS

| 5,054,668 | A | 10/1991 | Ricchiuti | |
|---|---|---|---|---|
| 5,501,384 | A * | 3/1996 | Wisniewski | B60R 11/06 220/531 |
| 8,317,040 | B2 * | 11/2012 | Lanning | A47B 88/90 108/60 |
| 2007/0119885 | A1 * | 5/2007 | Miller | B60R 7/04 224/275 |
| 2015/0343956 | A1 | 12/2015 | Hipshier et al. | |

FOREIGN PATENT DOCUMENTS

| DE | 102004045522 A1 | 3/2006 |
|---|---|---|
| DE | 102006056511 A1 | 6/2008 |
| DE | 102008018559 A1 | 10/2009 |
| JP | 2010006206 A | 1/2010 |

OTHER PUBLICATIONS

German Patent Office, German Search Report for German Application No. 102015002834.0, dated Oct. 14, 2015.

* cited by examiner

*Primary Examiner* — Joseph D Pape
*Assistant Examiner* — Dana Ivey
(74) *Attorney, Agent, or Firm* — Lorenz & Kopf LLP

(57) ABSTRACT

A storage compartment for a motor vehicle includes a fixed structural and at least one dividing element that is magnetically fastenable to the structural part in order to form a section together therewith in such manner that a surface section of the dividing element forms a first part of a partition of the section, and a surface section of structural part forms a second part of the partition. The dividing element is deformable in such manner that it can be fastened to structural part in a plurality of different installation form, thereby creating different sections together with the structural part without requiring varied partitions.

20 Claims, 8 Drawing Sheets

STORAGE COMPARTMENT WITH MAGNETIC DIVIDING ELEMENTS

CROSS-REFERENCE TO RELATED APPLICATION

Thin application claims priority to German Patent Application No. 102015002834.0, filed Mar. 5, 2015, which is incorporated herein by reference in its entirety.

TECHNICAL FIELD

The present disclosure pertains to a storage compartment for a motor vehicle.

BACKGROUND

Storage compartments in motor vehicles are often used to hold a wide variety of objects. Such objects may range from small items like coins or cigarette lighters to larger objects such as mobile phones or wallets, and even relatively bulky objects, beverage bottles or handbags, for example. The great variety of objects that need to be accommodated and the different sizes and shapes thereof means that the storage compartment can often become untidy.

It is known, from DE 102008018559 A1 (DE '559) for example, that the glove compartment in a motor vehicle is used to hold all kinds of small items. Since the glove compartment have only a single undivided space, it is typically rather disorganized. The underlying document DE '559 purports to create a better-organized glove compartment. Accordingly, it is suggested in DE'559 to arrange a number of inserts inside the glove compartment to divide it into smaller spaces, wherein shape and/or size of the various inserts may be adapted to each object that is to be accommodated, to prevent the objects from falling out of the inserts.

The inserts known from DE '559 are all unchangeable in terms of size and shape. This means that it is necessary to provide an insert having a shape and size matching the shape and size of each different object for storage, which results in a set of many inserts. Consequently, many different inserts corresponding to many different objects must be provided and installed in the glove compartment according to requirements.

SUMMARY

The present disclosure provides an improved storage compartment in a motor vehicle, wherein the preferred or advantageous embodiments of the present disclosure are revealed in the following description, claims and/or the accompanying figures.

The claimed storage compartment for a motor vehicle includes a fixed structural part. It further includes a dividing element. The dividing element can be magnetically attached to the structural part. In particular, therefore, a magnetic attraction between the two magnetic elements on the dividing element and the structural part respectively is used to fasten the dividing element to the structural part. In the fastened state, the dividing element together with the structural part forms a section inside the storage compartment. The section is created in such manner that a surface section of the dividing element forms a first part of the section partition. A surface section of the structural part forms a second part of the section partition. The dividing element is deformable. The nature and function of this deformability is to ensure that the dividing element can be fastened to the structural part in at least two different Installation forms, thereby creating two different sections. As a consequence of fastening in either of the installation forms, the dividing element together with the structural part thus forms a corresponding section. Two different sections are created for two different Installation forms. The storage compartment may be used for insertion or installation in a door trim, a glove compartment, a luggage compartment or a center console of a motor vehicle, for example.

In the case of the claimed storage compartment, different sections may be created by deformation of a single dividing element and the corresponding attachment thereof in a single installation form, to adapt the sections to the objects they are intended to accommodate, particularly in terms of shape and/or size. Instead of providing a number of different dividing elements—whose shape and size cannot be changed—and swapping these out to create different sections. Therefore, a single dividing element may be adapted according to requirements by deformation and variation of its attachment to the structural part, thereby forming different sections. In this way, many times more variations in the section combinations may be produced, in particular by providing a certain number of dividing elements, and the deformation and corresponding fastening thereof to the structural part. In particular, the deformation and variation in fastening of the dividing elements enables the storage compartment and/or various sections in the storage compartment to be configured individually.

Since the dividing elements are fastened to the structural part magnetically, it is easily possible to reconfigure a storage compartment with different sections. The dividing elements are not susceptible to destruction, because the application of excessive force merely releases the magnetic attachment between the structural parts and dividing element, the dividing element itself is not mechanically overloaded. The dividing elements may be easily replaceable and/or expandable, by purchasing additional dividing elements, for example. The storage compartment can be configured or divided into individual sections freely according to the user's personal needs. Thus, the storage compartment is sturdy and includes a small number of individual parts, which makes it inexpensive to manufacture.

In particular, the dividing element is not only able to assume different installation forms, but also different installation positions with the same or an altered installation form on the structural part. In other words, the dividing element is then fastened magnetically to the structural part in changed positions relative to the structural part while its shape may remain the same or change. An advantage of this is that identical sections can also be created at different places relative to the structural part, that is to say at different positions in the storage compartment.

The magnetic fastening is provided particularly by magnetic elements. A magnetic element is either an "active" magnet, particularly a neodymium magnet, which generates a magnetic field, or alternatively a "passive" magnetic element, such as a metal panel, which does not actively generate a magnetic field but interacts with an active magnet in such manner that a mutual attraction is created between the two elements. The magnetic elements are configured in such a way inside the storage compartment that such magnetic elements are positioned opposite each other to exert the magnetic attraction at the fastening positions provided, for all intended combinations of dividing elements and structural element. Thus, at least one active magnet is needed for each fastening, the corresponding counterpart may also be an active magnet or equally a passive magnetic element.

One advantage of using magnetic force is that the fastening created can be cancelled again simply by overcoming the retaining or attractive force. In particular, the retaining force in the fastened state is of such an order that it manually without the aid of tools.

In particular, the entire partition of the section is formed entirely by the structural part and dividing element. In particular, the partition is a continuous surface, without interruptions, that is to say an element in the shape of e.g. a cup, a bowl or a box is formed, which has only one opening into or from which objects can be placed or removed.

In a preferred embodiment of the present disclosure, different sections are differentiated by their size and/or geometrical shape. Thus for example, sections may be created with different sizes and/or geometrical shapes for items that are to be accommodated.

In a preferred embodiment, at least one fastening position between a dividing element and the structural part if changed for each different installation form of the dividing element. The fastening position is a position at which the dividing element is magnetically attached to the structural part in the installed state. This means that in order to change a first installation form into a second installation form, the dividing element is shifted relative to at least one fastening position on the structural part from a first position on the structural part to a second, different position on the structural part. This offers the advantage that a new installation form can be created even if all positions for fastening the dividing element to the structural element except one are unchanged.

In a preferred embodiment, the dividing element includes at least two magnetic elements. The structural part includes at least one magnetic element. The dividing element is fastened to the structural part by magnetic attraction between the respective magnetic elements thereof. Thus, in other words, in order to create each mutual fastening, a magnetic element of the dividing element must be magnetically connected to a magnetic element of the structural part. Because magnetic elements are provided on both the structural part and the dividing element, other magnetically effective parts can also be attached to each of these points, which in turn enable further application options for the dividing element and structural part. For example, if a magnetic element of the structural part is incorporated in the bottom thereof, it is possible to magnetically fasten an additional component to said bottom, such as a cup holder that is also furnished with magnetic elements in its own bottom.

In particular, the dividing element has two ends, and a magnetic element is attached to each end. This offers the advantage that the dividing element may be fastened to the structural part at both ends, and so is firmly retained thereby.

In a variant of the embodiment described, the dividing element has at least two discrete magnetic elements, which are particularly positioned at a distance from each other. Each of the discrete magnetic elements establishes a discrete fastening position on the dividing element. A distance between the discrete magnetic elements of the dividing elements may be for example at least 5 cm, preferably at least 10 cm. In other words, this means that the dividing element may only ever be fastened magnetically to the structural part at each discrete position where a discrete magnetic element is provided. This has the advantage that only certain, intended positions or zones of the dividing element can be fastened to the structural part, so that certain, intended configurations can be specified for sections.

In a further variant of this embodiment, it is assumed that one of the first magnetic elements of the dividing element is fastened to the structural part at a first fastening position. For this case, one of the second magnetic elements of the dividing element can then be magnetically fastened to the structural part in at least two different fastening positions. Again, each fastening takes place at the one or more magnetic element(s) of the structural part. In other words, if a first point, region or zone of the dividing element has been defined at a first fastening position on the structural part, a second point, region or zone of the dividing element may be fastened to the structural part at two different fastening positions in any way desired, or variably. In this way, it is possible—by transposing at least one fastening position of the dividing element—for the dividing element to assume various installation forms or to form different sections by interacting with the structural part.

In a preferred variant of this embodiment, the structural part includes at least one extended magnetic element. The extended magnetic element enables a continuously variable fastening position to the structural part over its entire length. In this way, it is possible to magnetically fasten the dividing element, or the magnetic element thereof—within the length of the magnetic element of the structural part—to any desired position of the structural part. In particular, the dividing element can thus be fastened magnetically to the structural part without spatial restriction, that is to say at freely selectable positions in the corresponding region thereof. In this way, it is possible to configure the installation form of the dividing elements and thus also of sections with a particularly high degree of variability.

In a further preferred variant of this embodiment, the structural part includes at least two magnetic elements that are arranged discretely, particularly at a distance from each other. Each of the discrete magnetic elements defines a discrete fastening position on the structural part. A distance between the discrete magnetic elements of the structural part may be for example at least 1 cm, preferably at least 5 cm, more preferably at least 10 cm. In other words, therefore, the dividing element—or a magnetic element thereof—can only be fastened to the respective discrete position on the structural pail where a discrete magnetic element is provided. This offers the advantage that dividing elements can only be fastened to certain, intended points or zones of the structural part, so that so that certain, intended configurations can be specified for sections.

In particular, therefore, metal strips or magnetic strips are attached to the outer side of the structural part. The outer side is the side facing away from the installed dividing elements.

In a preferred embodiment, the dividing element has an inherently stable resting shape. The dividing element assumes its resting shape when no external forces are acting on it. The dividing, element can be deflected from its resting shape into a working shape that differs from the resting shape against an elastic force. The elastic force is that force with which the dividing element resists a desired deformation from the resting shape. In particular, this means that the dividing element returns to its resting shape from any working shape as soon as no external forces are acting on it any more. In order to deflect the dividing element from its resting shape into a working shape, an external force must be applied against the elastic force. In particular, therefore, the dividing element is not limp, like a rope, for example, which remains in any bent shape if no force is acting on the rope. On the contrary, the dividing element has rigidity, so it can be transformed into a working shape by the effect of an external force, but it resumes its resting shape—also resiliently—when the external force is removed. Consequently, the resting shape is also inherently stable.

In particular, the dividing element is dimensioned relative to its elastic force in such manner that it can be shifted from its resting shape into its working shape by a person manually, without the aid of any tools. The elastic force is also of such strength that the dividing element is retained in the working shape by a magnetic force with which the dividing element is fastened to the structural part.

The advantage of this is that when the dividing element is fastened to the structural part in a working shape, an internal tension is set up in the dividing element by the elastic force, so that it retains a certain, specific shape, that is to say the working shape, as long, as only relatively small forces from items inside the section act on the dividing element. In other words, even though the dividing element has been deformed from its resting shape, it is still inherently stable in its working shape as well.

In a preferred embodiment, the dividing element is a rubber- or silicone-dividing element. Both of these materials are particularly suitable for generating the aforementioned inherently stable and elastic properties, and they are inexpensive.

In particular, the dividing element is thus a piece of rubber or silicone, each end of which is furnished with a support element. These support elements in the form of pockets hold neodymium magnets, which connect with corresponding metal or magnetic strips on the outer side of the structural parts when necessary, that is to say the band is fastened to the structural part due to the effect of a magnetic attracting force.

In a preferred embodiment, the dividing element is a band. In a preferred variant of this embodiment, the cross section of the band transverse to its lengthwise direction or the direction of its longitudinal extension has the same width and/or thickness continuously over the entire lengthwise direction thereof. Such a band can be manufactured particularly easily and inexpensively. Due to its constant thickness, bending behavior is constant. Its constant width lends the band an appealing overall appearance.

In particular, both ends of the band are terminated perpendicularly, and each end is furnished with a magnetic element, which extends along the end of the band, transversely to the lengthwise direction of the band, in particular over almost the entire width of the band, more particularly over at least 75% or 90% of the width, for example.

In a further preferred embodiment, the respective fastening of the dividing element to the structural part is assured solely by magnetic force. No other fastening elements besides the magnetic elements, such as positive locking elements, hook and loop strips or the like need to be provided on the dividing element or the structural part. The magnetic fastening also offers the capability of arranging the magnetic elements in the inner side or concealed in or on the dividing element or structural part. By the exclusive use of magnet force for fastening, the surfaces of the structural part and dividing element can be smooth at the respective positions, an that the surfaces are easy to clean, for example. In addition, in this way, an unobtrusive surface that does not differ from the rest of the surface is created at the sites of magnetic elements of the structural part or the dividing elements where fastening does not take place.

In an alternative embodiment, each fastening of the dividing element to the structural part is assured by magnetic force and at least one positive locking joint. The positive locking joint creates a form-fitting connection of the dividing element in a transverse direction. The transverse direction extends transversely to the direction of the magnetic force. That is to say, in particular transversely to the direction in which the attracting magnetic force that magnetically fastens the dividing element and the structural part is directed. In particular, the positive locking joint is created by form-fitting elements on the structural part, particularly grooves in the structural part that cooperate in positive locking manner with the dividing element. The additional positive locking fastening serves to retain the dividing element firmly and securely against the structural part.

In a preferred embodiment, support element for the magnetic element is affixed to the dividing element and/or the structural part. The magnetic element is retained in or on the support element. The support element is particularly a pocket, more particularly a pocket that is conformed as a single part with the structural part or the support element. In particular, the magnetic element is affixed to the structural part or the support element by adhesion, encapsulation, or in a two-component injection molding process (2K-technology). Regarding the positive locking joint described above, the form-fitting elements on the structural part, e.g., the grooves described previously cooperate quite effectively with the support element of the dividing elements to create a form lock.

The present disclosure also provides a motor vehicle equipped with a storage compartment as described above, and preferably in the forms of a door trim, glove compartment, luggage compartment or center console thereof.

A method for creating different sections in a storage compartment with the aid of a dividing element that is fastened magnetically to a structural part is also disclosed herein. Together with the structural part, the dividing element forms a section such that a surface section of the dividing element forms a first part of a partition of the section, and a surface section of the structural parts forms a second part of the partition. In this context, the dividing element is deformed to change between two different installation forms such that together with the structural part it forms at least two different sections.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. Identical or equivalent parts in the Figs are each designated with the same reference sign.

Figure 1:
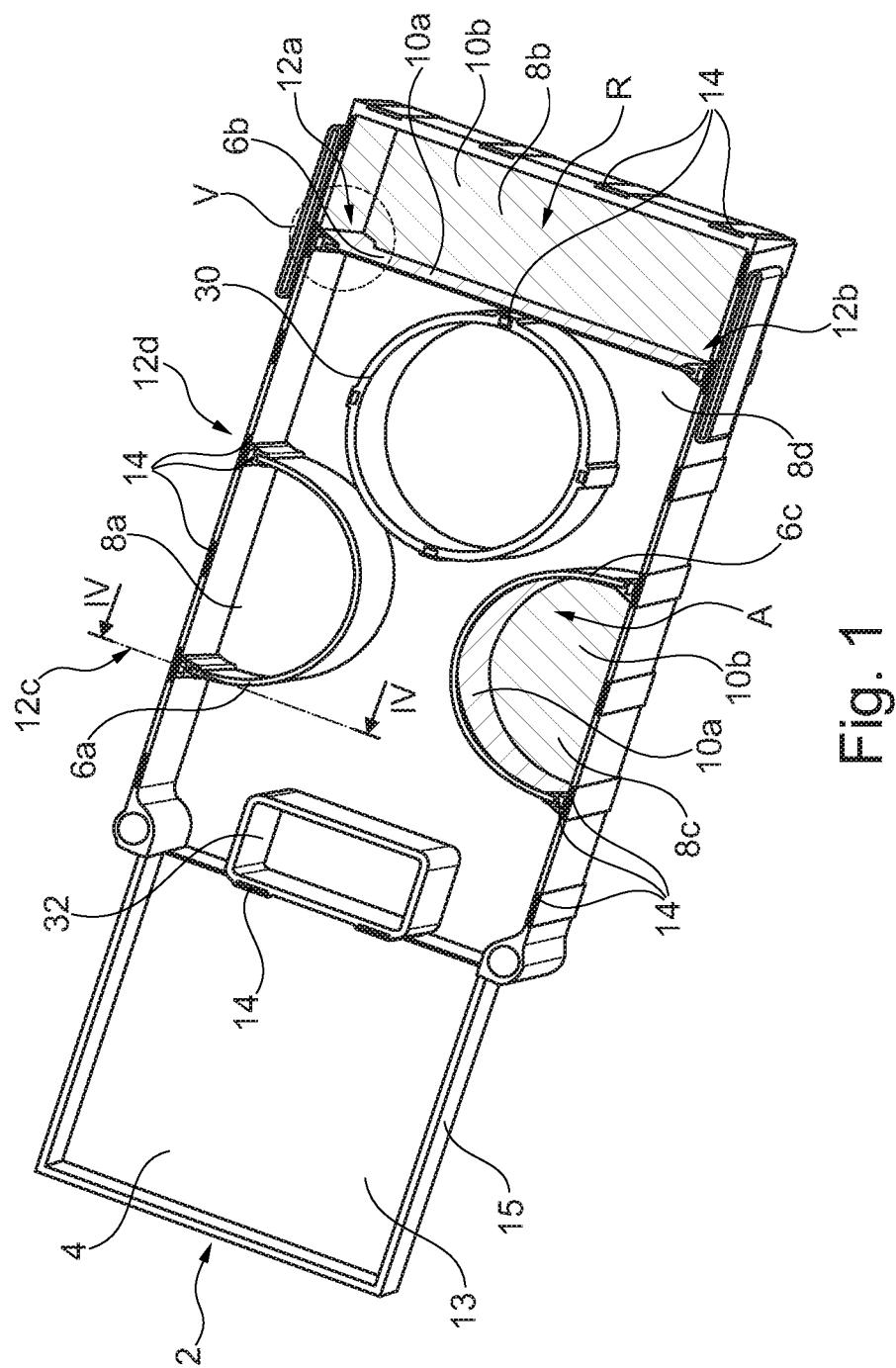
FIG. 1 shows a perspective cross sectional view of a storage compartment along section plane I-I in FIG. 2.
Figure 2:
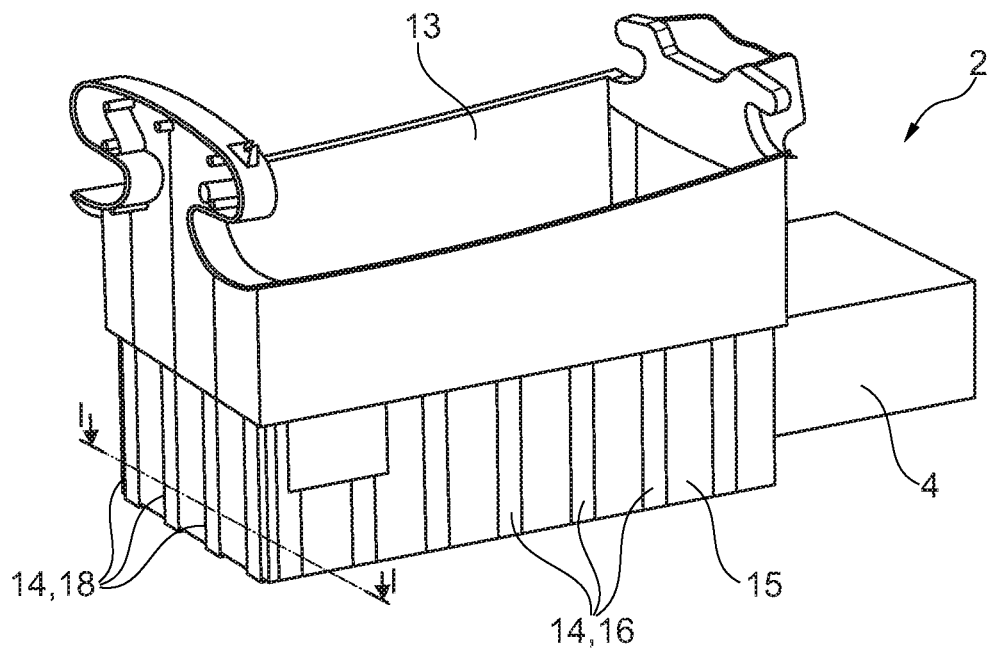
FIG. 2 shows the entire storage compartment according to FIG. 1.

FIGS. 1 and 2 show a storage compartment 2 in a motor vehicle. FIG. 1 is a cross sectional view in which the part above section plane I-I in FIG. 2 is omitted. Storage compartment 2 includes a static structural part 4, that is to say the part is mounted in fixed manner in the vehicle. Structural part 4 is particularly a molded plastic part with a substantially trough-like design, having a bottom and sidewalls. When installed in the vehicle in the normal operating position, the bottom extends roughly in a horizontal plane. Storage compartment 2 further includes a total of three dividing elements 6a-c. Each of the dividing elements 6a-c is fastened magnetically to structural part 4. Together with structural part 4, dividing elements 6a-c form a total of four sections 8a-d. The dividing elements thus form dividing walls in the structural part. With reference to sections 8b,c for exemplary purposes, it is shown how surface sections of the dividing elements 6b,c each form a first part 10a of a partition of sections 8b,c. Surface sections of structural part 4 each form a second part 10b of the corresponding partition of sections 8b,c. Dividing elements 6a-c are each deformable. This is evident in FIG. 1, since the dividing elements 6a-c are identical and therefore interchangeable. Dividing element 6b has a first, specifically linear installation form. Dividing elements 6a,c have a second, specifically bent installation form. All dividing elements 6a-c may be shaped into either form. The installation positions of dividing elements 6a-c in structural part 4 may also differ and may be varied by swapping them out. Moreover, other installation forms and positions may be chosen for each of the dividing elements 6a-c, as will be explained in the following.

Thus, various sections 8a-d of different sizes and/or geometrical shapes may be formed by one and the same dividing element 6a-c by varying the installation form and/or placing it in different installation positions. Dividing elements 6a-c are fastened magnetically to structural part 4 in the installation position shown for each. The fastening for each is realized at the respective fastening positions, of which fastening positions 12a-d are indicated in FIG. 1 for exemplary purposes. In order to change the installation form and position for example, one end of dividing element 6b—with dividing element 6a removed—is detached from fastening position 12h and then reconnected to structural part 4 at fastening position 12c. In this way, the sections may be reconfigured. Additionally, the other end may be detached from fastening position 12a and fastened instead to fastening position 12d. Then, dividing element 6b takes up exactly the same position as dividing element 6a shown in FIG. 1, and another altered installation form and different installation position is created for dividing element 6b.

Each dividing element 6a-c includes two magnetic elements 14, in this case neodymium magnets. Structural part 4 also includes several magnetic elements 14, in this case metal strips. In order to preserve clarity, only some of the magnetic elements in FIG. 1 are identified with reference numbers. One of the dividing elements 6a-c is always fastened magnetically to structural part 14 by means of the magnetic connection, that is to say the exertion of a magnetic attraction force between two paired magnetic elements 14 at the fastening position 12a-d.

Other installation forms and positions for dividing elements 6 not shown—are evident in FIG. 1, when the magnetic elements 14 thereof are connected with the respective magnetic elements 14 of structural part 4. It is also possible to rearrange the dividing elements 6a-c shown in FIG. 1 in any way to connect with any other magnetic elements 14 of structural part 4.

Dividing elements 6a-c are each affixed to an inner side 13 of structural part 4. On the other hand, magnetic elements 14 of structural part 4 are attached to the outer side 15 so that they are concealed when viewed from the inside out.

Further or additional holding devices, such as a cup holder 30 and a small items receptacle 32, are also included in the storage compartment. These are also equipped with their own magnetic elements 14 in the form of permanent magnets, in the walls and bottoms thereof. The further holding devices are also fastened to structural part 4 by using the magnetic elements 14 in the walls and/or bottom thereof. This is also shown again in FIG. 3. In the case of these further holding devices, the installation position in structural part 4 can be changed, but not the installation form thereof.

Dividing element 6b is in a resting shape F, the dividing elements 6a,c are shifted from this resting shape into a working shape A by applying a deforming force. This will be explained in greater detail in the following.

Figure 3:
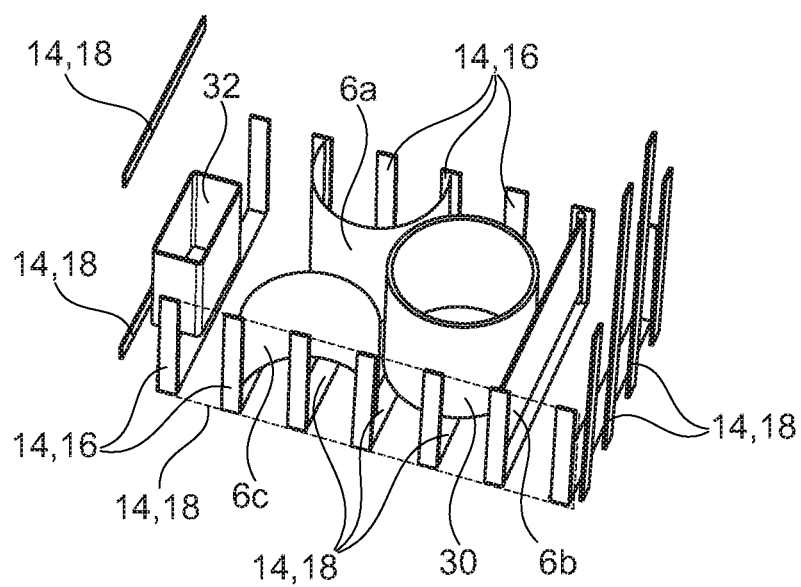
FIG. 3 shows the storage compartment according to FIG. 2 with the structural part omitted.

FIG. 2 shows storage compartment 2 or the complete structural part 4 thereof, wherein the installed dividing elements 6a-e are not visible in the illustration. Magnetic elements 14 of structural part 4 are visible on the outer side 15 thereof, where they are partially encapsulated in the material. FIG. 3 shows the complete arrangement of FIGS. 1 and 2, although structural part 4 has been omitted for the sake of clarity. FIGS. 2 and 3 show the following:

Some of the magnetic elements 14 of structural part 4 are approximately the same size as the magnetic elements 14 of dividing elements 6a-c. Dividing elements 6a-c may therefore only be fastened to such a magnetic element 14 of structural part 4 discretely, in a defined installation position. Such magnetic elements 14 of structural part 4 are therefore discrete magnetic elements 16. On the other hand, other magnetic elements 14 of structural part 4 are larger than the magnetic elements 14 of dividing elements 6a-c. Consequently, dividing elements 6a-c may be fastened variably to one and the same magnetic element 14 of structural part 4 in various installation positions. These magnetic elements 14 of structural part 4 are therefore extended magnetic elements 18.

FIG. 3 particularly shows the arrangement of the magnetic elements 14 of structural part 4. This is the first view of magnetic elements 14, which located under the bottom of structural part 4, and are also larger than the magnetic elements 14 of dividing elements 6a-c, and are therefore also extended magnetic elements 18. In an alternative embodiment indicated by a dashed line, all of the discrete magnetic elements 16 of structural part 4 arranged at the front in FIG. 3 are replaced by a single extended magnetic element 18, in this case a sheet metal panel. Magnetic elements 14 of dividing elements 6 can then be fastened in continuously variable manner to any desired position on the lateral surface of structural part 4.

Figure 4:
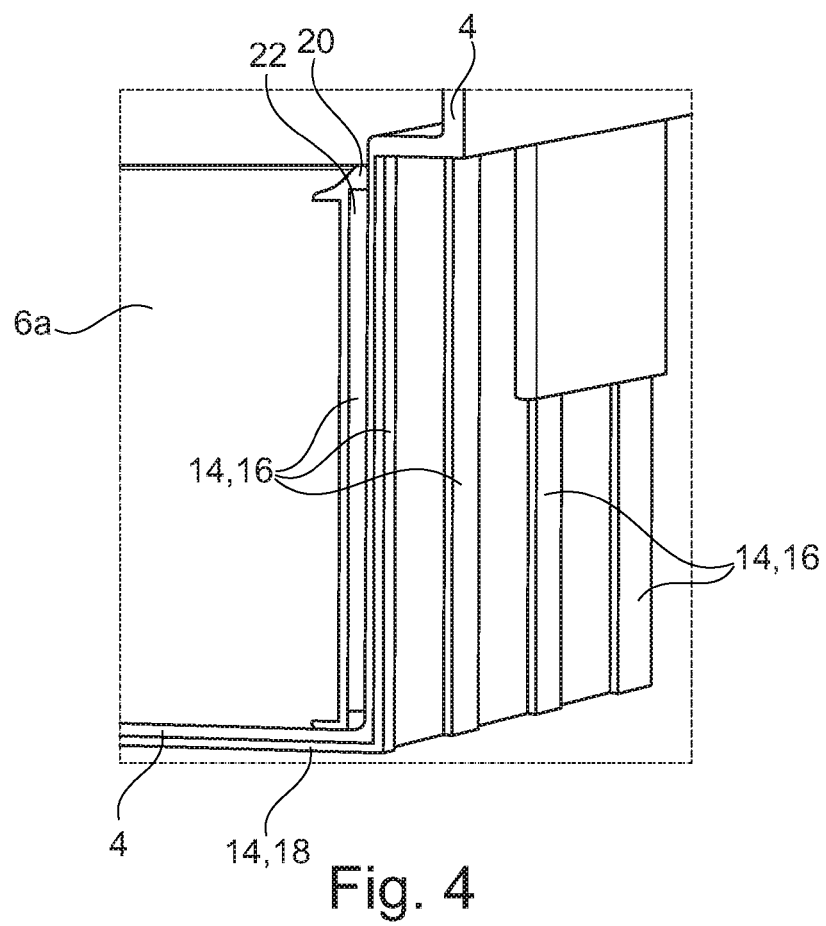
FIG. 4 shows a perspective cross sectional view of the storage compartment of FIG. 2 along section plane IV-IV in FIG. 1.

FIG. 4 is a cross sectional view along line IV-IV of FIG. 1 through the complete arrangement according to FIG. 2. An end piece 20 is provided on the end of dividing element 6a. This is conformed to 2K-technology on the rubber or silicone material of the band-like part of the dividing element. End piece 20 includes a support element 22 in the form of a pocket for magnetic element 14, that is to say the neodymium magnet. Magnetic element 14 exerts a magnetic attracting force together with the magnetic element 14 of structural part 4, that is to say the metal strip, through the materials of end piece 20 and of structural part 4. Since the neodymium magnet is also so small and unobtrusive that it only allows a connection with magnetic elements 14 of the structural part 4 at this position, this is also a discrete magnetic element 16.

Figure 5:
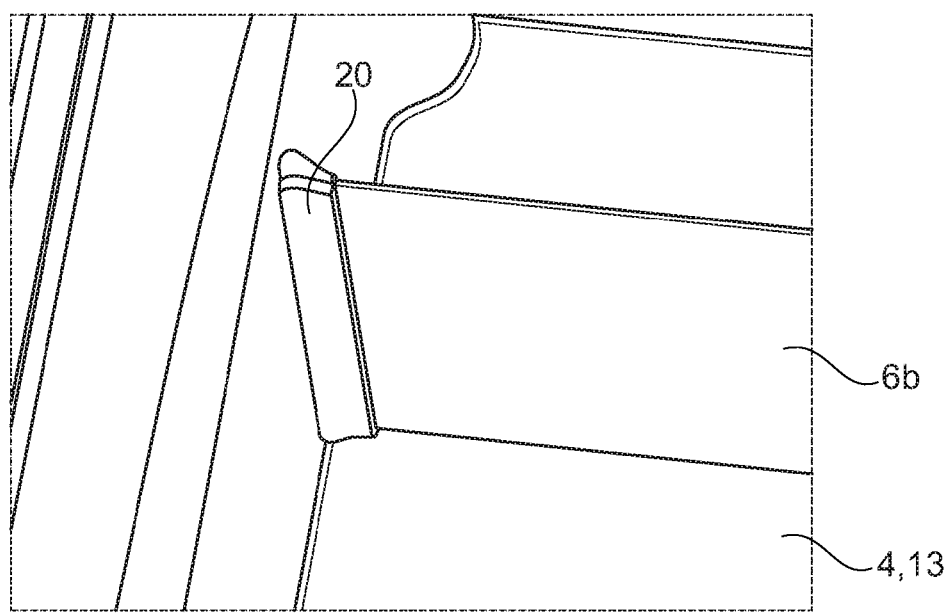
FIG. 5 shows a detail from FIG. 2 according to detail area V in FIG. 1.

FIG. 5 shows an enlarged view of a portion corresponding to the detail area V in FIG. 1 of the complete arrangement as shown in FIG. 2. Here, end piece 20 is visible, conformed on the end of the band-shaped pail of dividing element 6b.

Figure 6:
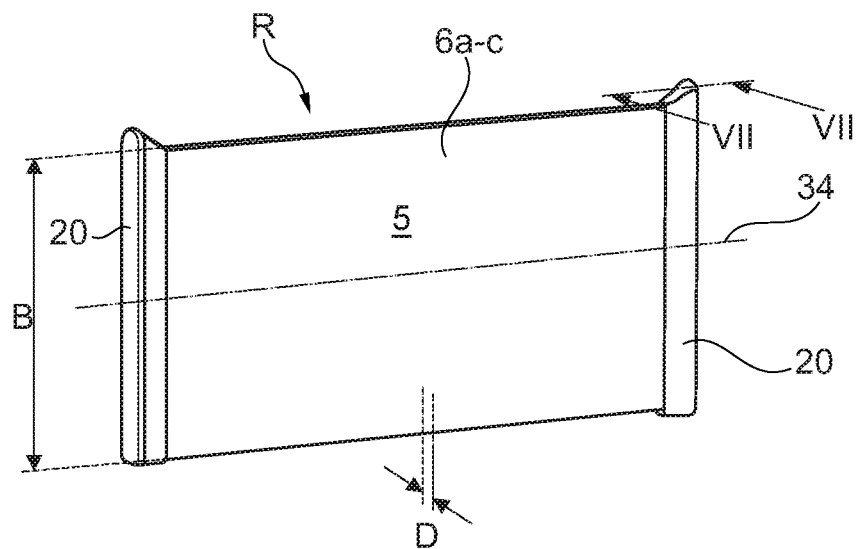
FIG. 6 is a perspective view of a dividing element.

FIG. 6 shows the dividing elements 6a-c of FIG. 1 after they are removed from structural part 4. Since no external force is being exerted on them, they are in an inherently stable resting shape R. This shape is retained as long as no forces are applied to the dividing elements 6a-c. The end pieces 20 in which magnetic elements 14 are hidden are conformed on either end of a band 5 (i.e., the band-like main part). In order to shift dividing elements 6a,c into the working shape A shown in FIG. 1, an external force must be applied to the respective dividing element against an elastic force. The elastic force is engendered by the material property of the band 5. The band 5 has a constant cross section with the same width B and the same thickness D continuously transversely to its entire lengthwise direction 34.

Figures 7, 8:
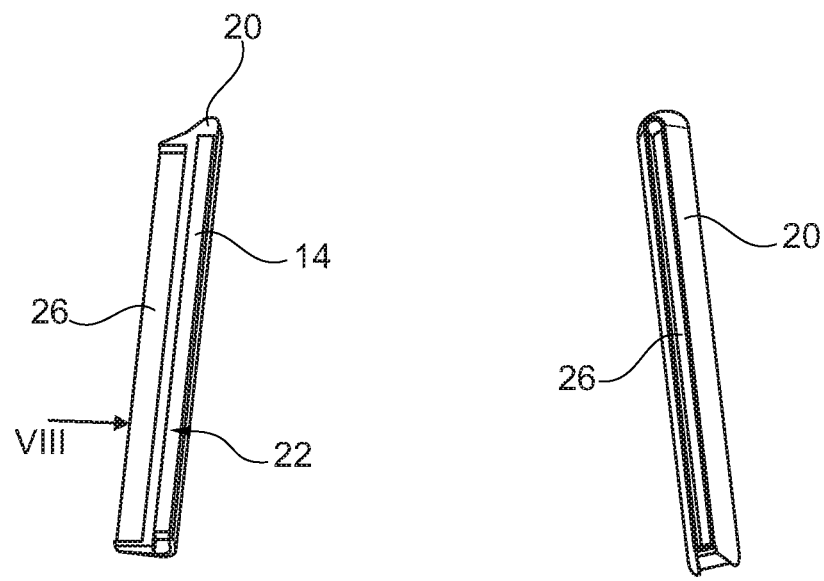
FIG. 7 shows the end piece of FIG. 6 along section plane VII-VII.
FIG. 8 shows the end piece of FIG. 6 without a band.

FIG. 7 shows a section through the right end piece 20 of FIG. 6, omitting the band-like part of dividing element 6a-c. The figure shows both the support element 22 in the form of a pocket with magnetic element 14 inserted and a seating groove 26 in which the band-like part is injected when the dividing element 6a-c is produced using 2K technologies.

FIG. 8 shows the entire end piece 20 of FIG. 7, uncut from viewing direction VII, which is why seating groove 26 is fully visible.

Figure 9:
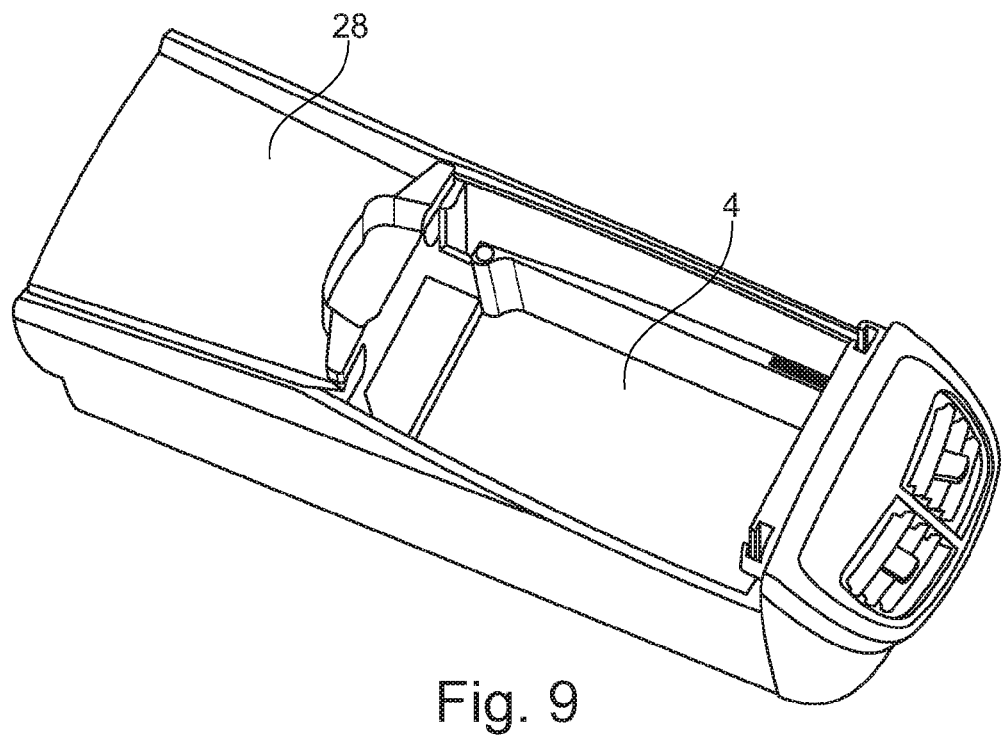
FIG. 9 shows a center console with storage compartment without dividing elements.

FIG. 9 shows structural part 4 installed in a center console 28 of a motor vehicle, wherein all dividing elements 6a-e have been removed. In this state, structural part 4 offers the greatest possible space for holding large objects, such as a handbag. It is also shown that the illustrated inner surface or inner side 13 is designed with smooth walls in the areas of all magnetic elements 14 of structural part 4, so the provision of corresponding fastening positions is not visible.

Figure 10:
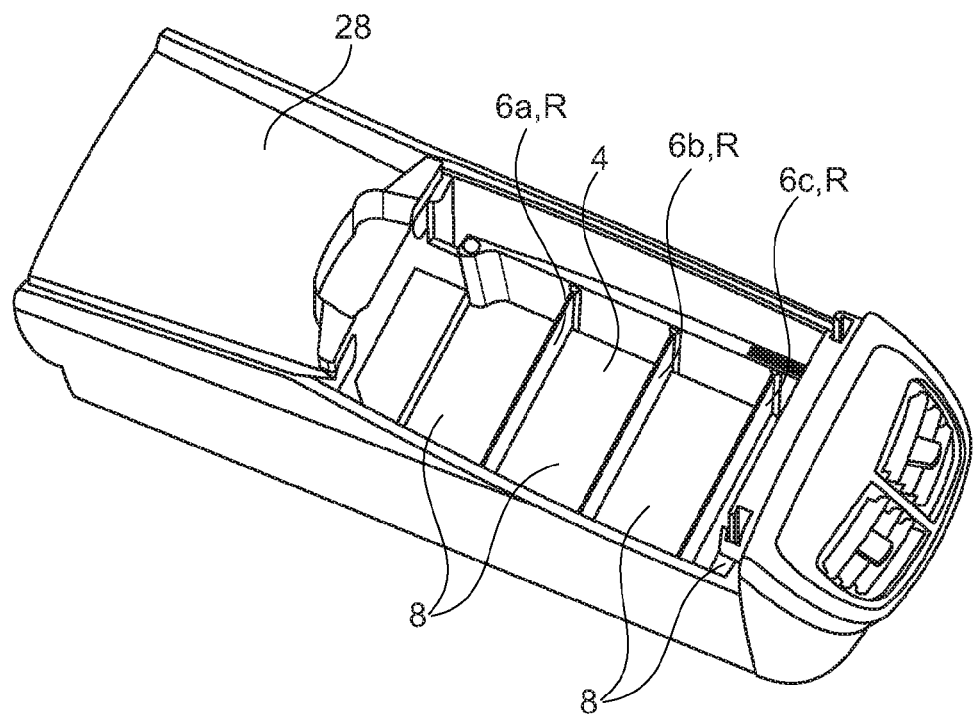
FIG. 10 shows the center console of FIG. 9 with three dividing elements.

FIG. 10 shows the center console 28 of FIG. 9 with three dividing elements 6a, b and c, each inserted in the resting shape R to create a total of four sections 8.

Figure 11:
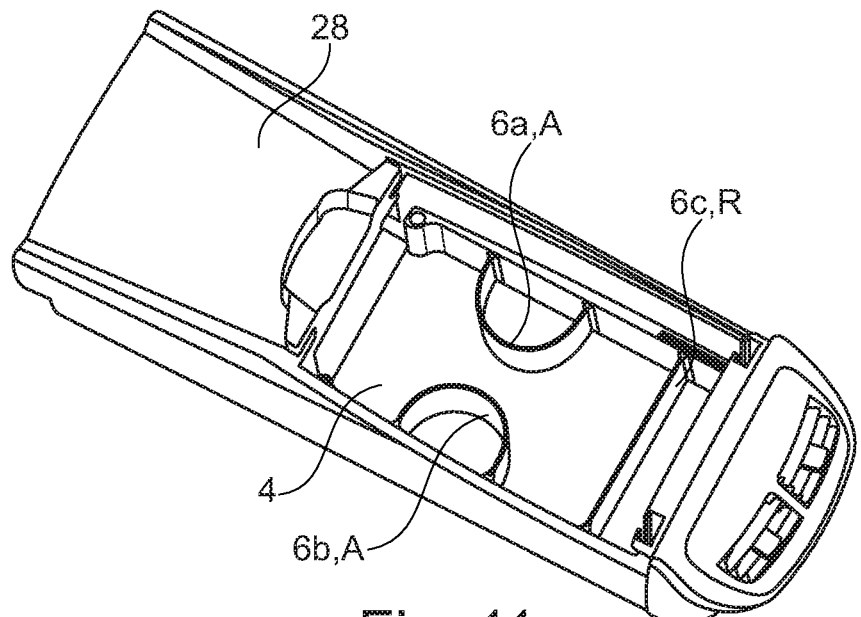
FIG. 11 shows the center console of FIG. 10 with dividing elements in a changed installation form.

FIG. 11 shows how the two dividing elements 6a,b of FIG. 10 have been taken out and reinserted in structural part 4 in a different installation form and in working shape A. In this way, four sections 8 are created, which however differ from the sections 8 of FIG. 10 in terms their shape and size, even though these are the same dividing elements 6a-c.

Finally, FIG. 12 again shows the configuration of dividing elements 6a-c in center console 28 for creating sections 8 according to FIG. 1, although in this case dividing elements 6b,c are still in their swapped positions. In addition, cup holder 30 and small items receptacle 32 have also been inserted again.

Figure 12:
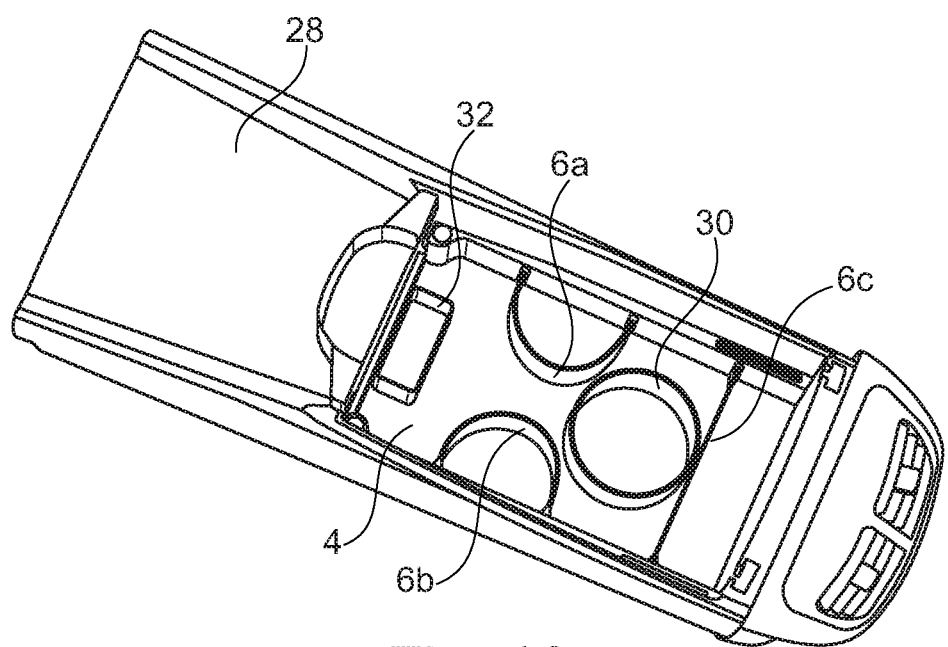
FIG. 12 shows the center console of FIG. 11 with additional fittings.

If all of the dividing elements are removed, the entire storage compartment 2 according to FIG. 9 is available for use as a space for large objects, such as handbags. If a large number of dividing elements 6a-c and accessory parts are inserted, as shown in FIG. 12, a large number of sections 8, that is to say individual compartments, may be created for deliberate, organized storage of, for example, keys, sweets, mobile phone, tissues, beverages, etc.

Figure 13:
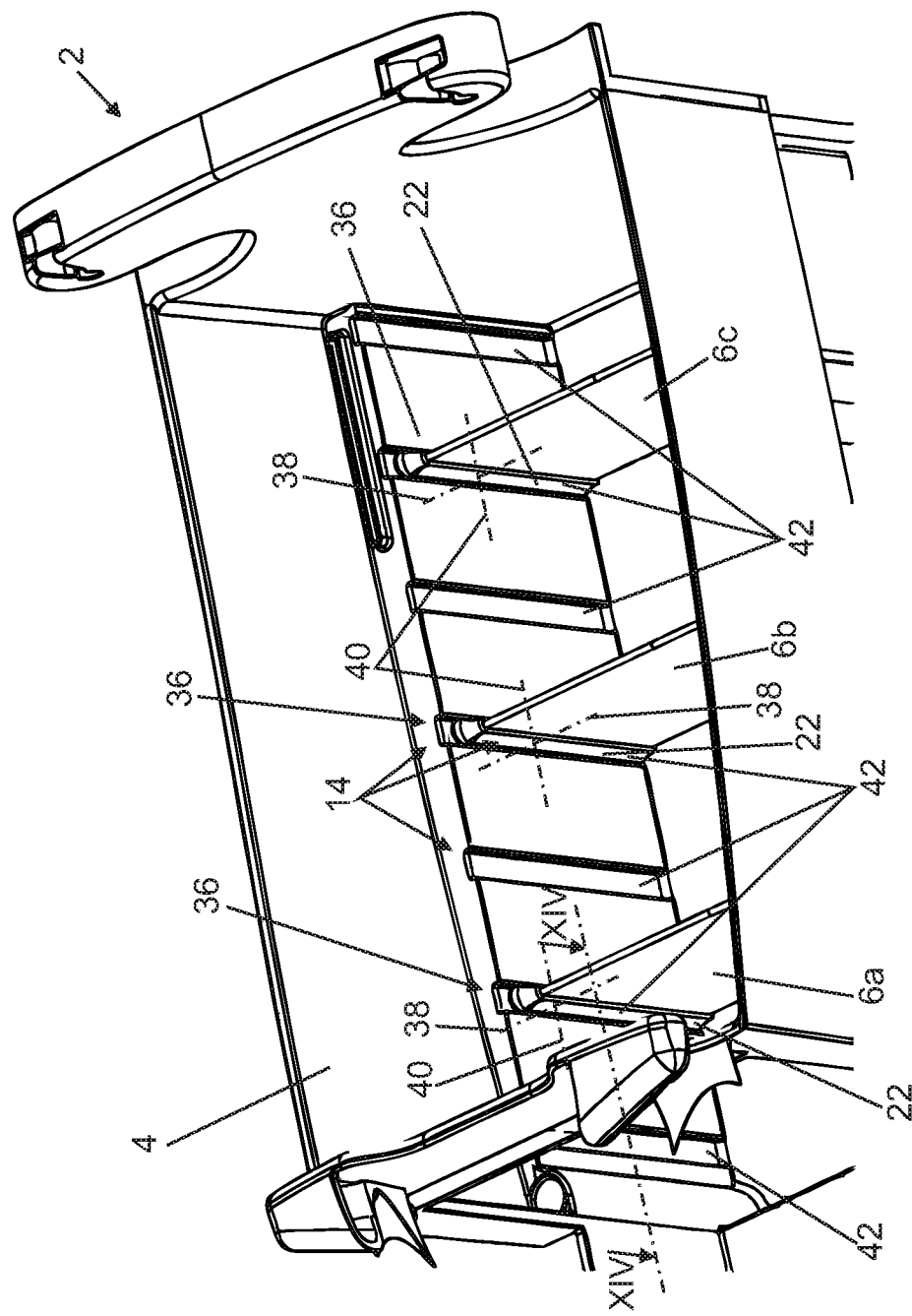
FIG. 13 shows an alternative storage compartment with positive locking joints.

FIG. 13 shows an enlarged detail of an alternative storage compartment 2. In this case, the fastening of dividing elements 6a-c to structural part 4 is assured by means of magnetic elements 14, on one side, as described previously. Said magnetic elements are not visible in FIG. 13, and their location is therefore only suggested, since they are each hidden in the partition of structural part 4 and in support elements 22. However, their position matches the position according to FIGS. 1 to 12. Magnetic fastening is assured by a mutually attracting magnetic force that is exerted along each of lines 38.

However, dividing elements 6a-c are fastened to structural part 4 additionally by positive locking joints 36, in this case in the form of grooves 42 in the partition of structural part 4, in which the dividing elements 6a-ca—and in this case the support elements 22 thereof—are lying in form-fitting manner. The form fit is created along the direction of lines 40 in each case that is to say transversely to the magnetic force.

Figure 14:
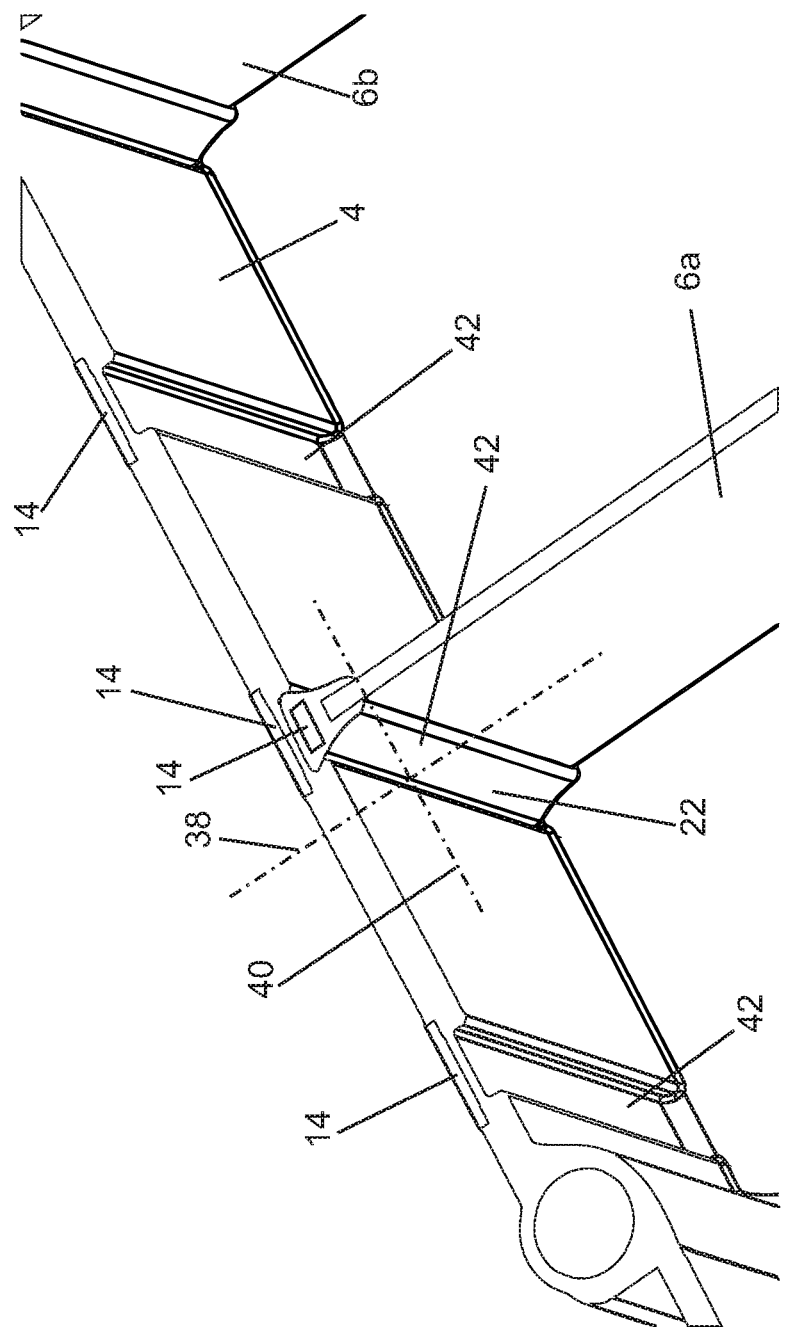
FIG. 14 shows a detail view along section line XIV-XIV in FIG. 13.

FIG. 14 shows a detail view of a cross section through storage compartment 2 along line XIV-XIV shown in FIG. 13. The magnetic elements 14 of structural part 4 and of the dividing elements 6a-c (embedded in support element 22) are visible. Consequently, it may also be seen that grooves 42 are aligned with the direction of the positive locking joint, that is to say along line 40, and centered on the respective magnetic elements 14 of structural part 4 in order to obtain the maximum possible magnetic force and to support the property thereof for self-centering in the magnetic field.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A storage compartment for a motor vehicle, the storage compartment having at least two configurations including a first configuration and a second configuration, the storage compartment comprising:
   a structural part having a base and a sidewall surrounding the base defining an interior space; and
   a dividing element that is elongate, the dividing element having a first end and a second end that are spaced apart along an axis of the dividing element, at least one of the first end and the second end configured to be magnetically fastenable to the structural part for partitioning the interior space in such manner that a surface section of the dividing element forms a first part of a partition in the interior space, and a surface section of the structural part forms a second part of the partition, wherein the dividing element is bendable between a first position and a second position, a curvature of the axis being different in the first position and the second position;

the dividing element, in the first configuration of the storage compartment, being in the first position and magnetically fastened to the structural part to form a first section of the interior space; and the dividing element, in the second configuration of the storage compartment, being in the second position and magnetically fastened to the structural part to form a second section of the interior space.

2. The storage compartment according to claim 1, wherein the first section and the second section differ in respect to at least one of a size and a geometrical shape.

3. The storage compartment according to claim 1, wherein at least one fastening position between the dividing element and the structural part is changed for each of the first configuration and the second configuration.

4. The storage compartment according to claim 1, wherein the dividing element comprises at least two magnetic elements, and the structural part has at least one magnetic element, wherein the dividing element is fastened to the structural part by a magnetic connection of the magnetic elements on both the dividing element and the structural element.

5. The storage compartment according to claim 4, wherein the dividing element comprises at least two discrete magnetic elements as magnetic elements, each of which defines a discrete fastening position on the dividing element.

6. The storage compartment according to claim 5, further comprising a first magnetic element of the dividing element fastened magnetically at a first fastening position on the structural part, a second magnetic element fastenable magnetically to the structural part in at least two different fastening positions.

7. The storage compartment 4, wherein the structural part comprises at least one extended magnetic element as the magnetic element, which enables a continuously-variable fastening position on the structural part over an area of the extended magnetic element.

8. The storage compartment according to claim 7, wherein the structural part comprises at least two discrete magnetic elements as the magnetic elements, wherein each of the discrete magnetic elements prescribe a discrete fastening position on the structural part.

9. The storage compartment according to claim 1, wherein the dividing element has an inherently stable resting shape from which it can be deflected against an elastic force into a different, working shape.

10. The storage compartment according to claim 1, wherein the dividing element comprises a dividing element made from one of rubber or silicone.

11. The storage compartment according to claim 1, wherein the dividing element comprises a band having a cross section with at least one of a constant width or a constant thickness transversely to a lengthwise direction thereof.

12. The storage compartment according to claim 1, wherein the respective fastening of the dividing element to the structural part is maintained exclusively by magnetic force.

13. The storage compartment according to claim 1, wherein the respective fastening of the dividing element to the structural part is maintained by magnetic force and at least one positive locking joint creating a form-fitting attachment of the dividing elements in a transverse direction relative to the direction of the magnetic force.

14. The storage compartment according to claim 1, wherein a support element for the magnetic element is affixed to one of the dividing element or the structural part.

15. A motor vehicle having a storage compartment according to claim 1.

16. A storage compartment for a motor vehicle, the storage compartment having at least two configurations including a first configuration and a second configuration, the storage compartment comprising:

a structural part having a base and a sidewall surrounding the base defining an interior space; and a dividing element with an elongate band having a first end and a second end, the first end and the second end being spaced apart along an axis of the dividing element, the dividing element including a first magnetic element supported on the dividing element proximate the first end and a second magnetic element supported on the dividing element proximate the second end, the first magnetic element and the second magnetic element configured to be magnetically fastenable to the structural part for partitioning the interior space in such manner that a surface section of the dividing element forms a first part of a partition in the interior space, and a surface section of the structural part forms a second part of the partition, wherein the band is elastically bendable between a first position and a second position, a curvature of the axis being different in the first position and the second position;

the band of the dividing element, in the first configuration of the storage compartment, being in the first position and the first magnetic element and the second magnetic element being magnetically fastened to the structural part to form a first section of the interior space; and the band of the dividing element, in the second configuration of the storage compartment, being in the second position and the first magnetic element and the second magnetic element being magnetically fastened to the structural part to form a second section of the interior space.

17. The storage compartment of claim 16, wherein the axis of the dividing element is substantially straight in the first position of the band; and wherein the axis of the dividing element is nonlinear in the second position of the band.

18. The storage compartment of claim 17, wherein the sidewall includes a plurality of walls that cooperatively surround the base, the plurality of walls including a first wall and a second wall that face each other across the base;

wherein, in the first configuration of the storage compartment, the first magnetic element is magnetically fastened to the first wall and the second magnetic element is magnetically fastened to the second wall; and wherein, in the second configuration of the storage compartment, the first magnetic element and the second magnetic element are magnetically fastened to the first wall.

19. The storage compartment of claim 18, wherein the first magnetic element is received in the dividing element, proximate the first end; and wherein the second magnetic element is received in the dividing element, proximate the second end.

20. The storage compartment of claim 19, wherein the structural part includes a third magnetic element that is configured to magnetically attach to the first magnetic element; and wherein the third magnetic element is encapsulated within the structural part.

\* \* \* \* \*